United States Patent
Castellano

(10) Patent No.: US 11,010,206 B2
(45) Date of Patent: *May 18, 2021

(54) CONSTRAINED PLACEMENT IN HIERARCHICAL RANDOMIZED SCHEDULERS

(71) Applicant: VMware, Inc., Palo Alto, CA (US)

(72) Inventor: Luca Castellano, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,562

(22) Filed: Feb. 11, 2019

(65) Prior Publication Data

US 2019/0188051 A1 Jun. 20, 2019

Related U.S. Application Data

(63) Continuation of application No. 15/798,026, filed on Oct. 30, 2017, now Pat. No. 10,235,212, which is a (Continued)

(51) Int. Cl.
*G06F 9/455* (2018.01)
*G06F 9/50* (2006.01)
(Continued)

(52) U.S. Cl.
CPC ........ *G06F 9/5077* (2013.01); *G06F 9/45558* (2013.01); *G06F 9/5005* (2013.01);
(Continued)

(58) Field of Classification Search
CPC .. G06F 9/45558; G06F 9/5066; G06F 9/4881; G06F 9/5027; G06F 9/5072;
(Continued)

(56) References Cited

U.S. PATENT DOCUMENTS 6,317,774 B1 * 11/2001 Jones .................... G06F 9/4887
709/226
6,529,934 B1 * 3/2003 Kawamura ........... G06F 9/4875
718/102
(Continued)

*Primary Examiner* — Dong U Kim
(74) *Attorney, Agent, or Firm* — Thomas | Horstemeyer LLP

(57) ABSTRACT

A distributed scheduler for a virtualized computer system has a hierarchical structure and includes a root scheduler as the root node, one or more branch schedulers as intermediate nodes, and a plurality of hosts as leaf nodes. A request to place a virtual computing instance is propagated down the hierarchical structure to the hosts that satisfy placement constraints of the request. Each host that receives the request responds with a score indicating resource availability on that host, and the scores are propagated back up the hierarchical structure. Branch schedulers that receive such scores compare the received scores and further propagate a "winning" score, such as the highest or lowest score, up the hierarchical structure, until the root scheduler is reached. The root scheduler makes a similar comparison of received scores to select the best candidate among the hosts to place the virtual computing instance.

17 Claims, 4 Drawing Sheets

Related U.S. Application Data continuation of application No. 14/986,161, filed on Dec. 31, 2015, now Pat. No. 9,804,895.

(60) Provisional application No. 62/211,671, filed on Aug. 28, 2015.

(51) Int. Cl.
*H04L 29/08* (2006.01)
*H04L 29/06* (2006.01)

(52) U.S. Cl.
CPC .......... *H04L 67/10* (2013.01); *H04L 67/1008* (2013.01); *H04L 67/1029* (2013.01); *H04L 67/38* (2013.01); *G06F 2009/4557* (2013.01); *G06F 2009/45562* (2013.01)

(58) Field of Classification Search
CPC ..... G06F 2209/5013; G06F 2209/5014; G06F 2209/505; G06F 9/505; G06F 9/5077; G06F 2009/45562; G06F 2009/4557; H04L 67/1008; H04L 67/1029; H04L 67/38; H04L 67/10
See application file for complete search history.

(56) References Cited

U.S. PATENT DOCUMENTS

| | | | |
|---|---|---|---|
| 6,909,691 B1 * | 6/2005 | Goyal | G06F 9/4881 370/230 |
| 7,823,154 B2 * | 10/2010 | Wang | G06F 3/0605 370/395.4 |
| 9,367,344 B2 * | 6/2016 | Udupi | G06F 9/45558 |
| 9,485,326 B1 | 11/2016 | Ulman et al. | |
| 2004/0123296 A1 * | 6/2004 | Challenger | G06F 9/5072 718/102 |
| 2006/0029079 A1 * | 2/2006 | Cohen | H04L 47/263 370/395.4 |
| 2007/0064711 A1 | 3/2007 | Wang et al. | |
| 2007/0294697 A1 * | 12/2007 | Theimer | G06F 9/5027 718/102 |
| 2008/0298230 A1 * | 12/2008 | Luft | H04L 41/5067 370/219 |
| 2011/0067030 A1 * | 3/2011 | Isard | G06F 8/433 718/102 |
| 2012/0020370 A1 * | 1/2012 | Sonnier | H04L 49/254 370/412 |
| 2012/0023498 A1 * | 1/2012 | Sundararaman | H04L 49/109 718/102 |
| 2012/0233668 A1 * | 9/2012 | Leafe | G06F 9/00 726/4 |
| 2014/0196054 A1 | 7/2014 | Brochard et al. | |
| 2015/0095910 A1 * | 4/2015 | Ge | G06F 9/505 718/1 |
| 2015/0277990 A1 * | 10/2015 | Xiong | H04L 67/101 718/106 |
| 2015/0334696 A1 * | 11/2015 | Gu | H04L 61/2015 718/1 |
| 2016/0139964 A1 * | 5/2016 | Chen | G06F 1/3206 718/104 |

* cited by examiner

US 11,010,206 B2

CONSTRAINED PLACEMENT IN HIERARCHICAL RANDOMIZED SCHEDULERS

CROSS-REFERENCE TO RELATED APPLICATIONS

This application is a continuation of, and claims the benefit of U.S. patent application Ser. No. 14/986,161, entitled "Constrained Placement in Hierarchical Randomized Schedulers," filed Dec. 31, 2015 and the benefit of U.S. patent application Ser. No. 15/798,026, entitled "Constrained Placement in Hierarchical Randomized Schedulers," filed Oct. 30, 2017. Both applications claim the benefit of U.S. Provisional Patent Application Ser. No. 62/211,671, filed Aug. 28, 2015, and all of the above applications are incorporated herein by reference in their entireties.

BACKGROUND

A virtualized computer system in which computing capacity is aggregated across a cluster of host computers (hereinafter referred to as "hosts") employs a scheduler that is responsible for placement of virtual computing instances, e.g., virtual machines (VMs) that employ guest operating systems, containers that do not employ guest operating systems, or other cloud-native (distributed) applications, in the hosts and migration of the virtual computing instances between the hosts to achieve load balancing. The scheduler that is used in VMware® vSphere™, which is commercially available from VMware, Inc. of Palo Alto, Calif., is known as the Distributed Resource Scheduler (DRS).

The DRS is implemented in a management server for VMs and performs the resource scheduling function for all of the hosts in a central manner. Resource usage by the different VMs in the hosts is reported to the DRS, and the DRS aggregates that information to make decisions on where to place new VMs and recommends migration of existing VMs between the hosts.

The use of a centralized scheduling solution such as the DRS in a cloud computing environment becomes impractical because the number of hosts for the DRS to manage is too large. For example, the number of hosts managed in a cloud computing environment can be one to several orders of magnitude greater than the number managed by a DRS.

SUMMARY

Embodiments provide a distributed scheduler for a virtualized computer system. The distributed scheduler has a hierarchical tree structure and includes a root scheduler as the root node, one or more branch schedulers as intermediate nodes, and a plurality of hosts of the virtualized computer system as leaf nodes. A distributed scheduler software component implemented in each host maintains data representative of available resources in the host, including devices to which the host is connected, and such data representative of connected devices is published to the branch scheduler parent of the host. Each of the branch schedulers is the parent node to a distinct set of hosts and configured with a distributed scheduler software component that maintains data representative of devices to which the hosts that are part of its set are connected, and further publishes aggregated data indicating such host connectivity to devices to the root scheduler.

According to an embodiment, a constrained request to place a virtual computing instance, with the constraint being a device to which the virtual computing instance's host must be connected, is propagated down the hierarchical tree structure from the root scheduler to the branch schedulers to the hosts. Although device connectivity is discussed herein as a representative example of a constraint that restricts placement, it should be understood that a constraint may generally include anything other than CPU and memory that the host must have access to (and that not all hosts have access to) for placement of a virtual computing instance, such as access to a particular network, network accelerator, graphics accelerator, storage device, and the like. The root scheduler may select a subset of branch schedulers that satisfy the constraint(s) in the request (i.e., a subset of branch schedulers that are associated with hosts connected to particular device(s)) which it forwards the request to, and each of the branch schedulers that receives the request may also select a respective subset of branch schedulers (or hosts if the branch scheduler has no child branch schedulers) that satisfy the constraint(s) to forward the request to. Then, each host responds with a score indicating resource availability on that host, and the scores are propagated back up the hierarchical tree structure. Branch schedulers that receive such scores compare the received scores and further propagate a "winning" score, such as the highest score, up the hierarchical tree structure, until the root scheduler is reached. The root scheduler makes a similar comparison of received scores to select the best candidate among the hosts to place the virtual computing instance.

DETAILED DESCRIPTION

Figure 1:
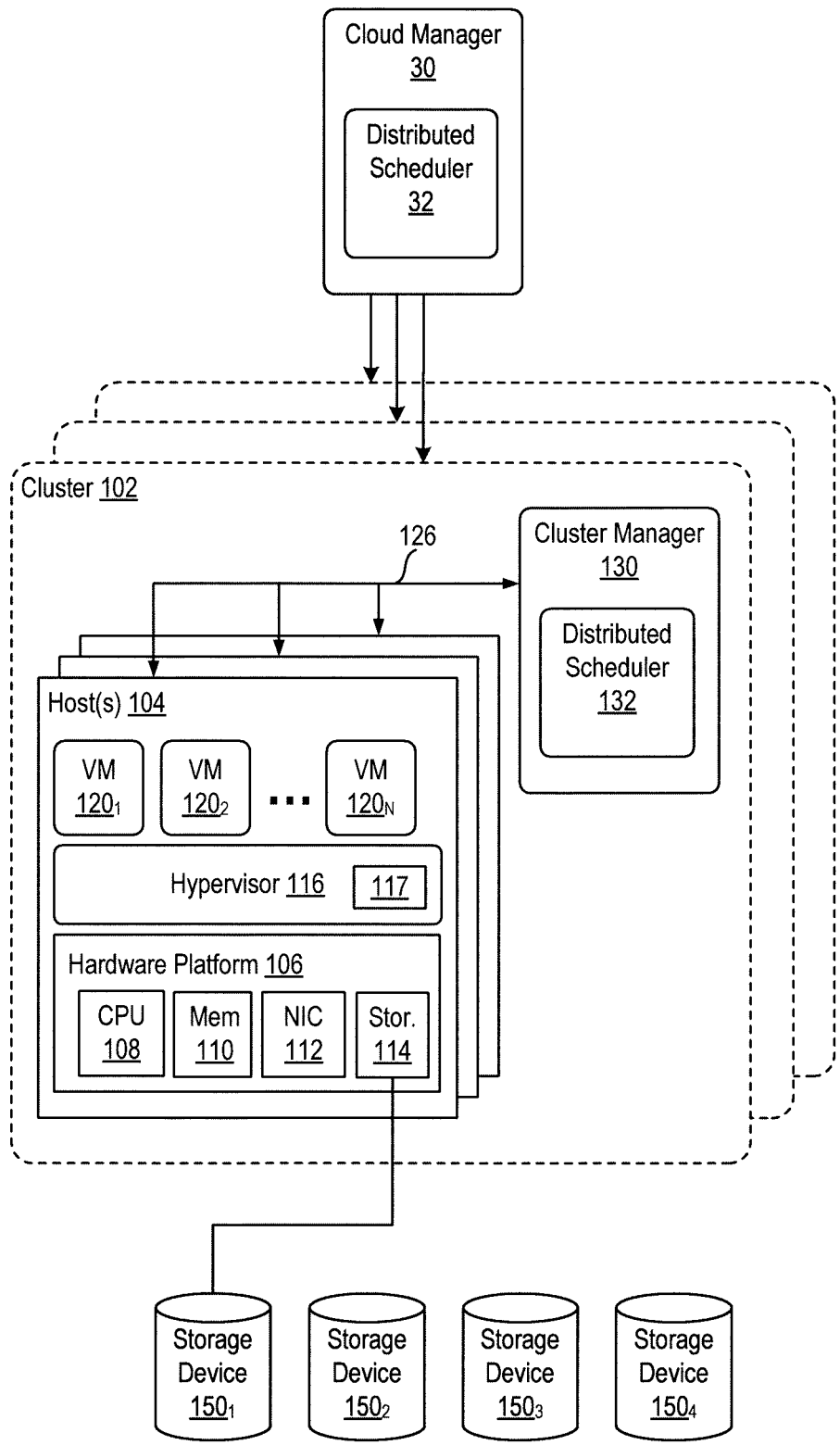
FIG. 1 is a block diagram of a cloud computing system in which embodiments may be implemented.

FIG. 1 is a block diagram of a cloud computing system in which one or more embodiments may be implemented. The cloud computing system of FIG. 1 includes a cloud manager 30, which manages the cloud computing system and may be implemented in a physical server or in a virtual machine (VM), and multiple clusters of hosts, where each cluster is managed by a cluster manager. For simplicity, only cluster 102, which is managed by cluster manager 130, and host 104 are shown in FIG. 1 and described herein. Other clusters have similar configurations as cluster 102, although the number of hosts within each cluster may vary. In addition, other hosts have similar configurations as host 104, although special hardware implemented in the hosts and storage device(s) communicating with the hosts may vary.

Cluster 102 includes one or more hosts, including host 104. Host 104 is constructed on a server grade hardware platform 106, such as an x86 architecture platform, a desktop, or a laptop. As shown, hardware platform 106 of host 104 includes conventional components of a computing device, such as one or more central processing units (CPU) 108, system memory 110, a network interface 112, a storage interface 114, and other I/O devices such as, for example, a mouse and keyboard (not shown). CPU 108 is configured to execute instructions, for example, executable instructions that perform one or more operations described herein and may be stored in system memory 110 and in local storage. System memory 110 is a device allowing information, such as executable instructions, cryptographic keys, virtual disks, configurations, and other data, to be stored and retrieved. System memory 110 may be, for example, one or more random access memory (RAM) modules. Network interface 112 enables host 104 to communicate with another device via a communication medium. Network interface 112 may be one or more network adapters, also referred to as a Network Interface Card (NIC). Storage interface 114 represents an interface to local storage devices (e.g., one or more hard disks, flash memory modules, solid state disks, and optical disks) and/or to one or more network data storage systems. In one embodiment, storage interface 114 is a host bus adapter (HBA) that couples host 104 to one or more storage devices 150 that are configured as storage area network (SAN) devices. In another embodiment, storage interface 114 is a network interface that couples host 104 to one or more storage devices 150 that are configured as network-attached storage (NAS) devices.

Host 104 also provides a virtualization layer that abstracts processor, memory, storage, and networking resources of hardware platform 106 into multiple virtual computing instances that run concurrently therein, the virtual computing instances being implemented as virtual machines 120$_1$ to 120N (collectively referred to as VMs 120) in this embodiment. VMs 120 run on top of a software interface layer, referred to herein as a hypervisor 116, that enables sharing of the hardware resources by VMs 120. One example of hypervisor 116 that may be used in the embodiments described herein is a VMware ESX® hypervisor, which is provided as a component of the VMware vSphere® product made commercially available from VMware, Inc. Hypervisor 116 may run on top of the operating system of host 104 or directly on hardware components of host 104.

Cluster manager 130 communicates to the hosts in its cluster via a network. In one embodiment, cluster manager 130 is a computer program that resides and executes in a central server, or alternatively, running as a VM in one of the hosts 104. One example of cluster manager 130 is the vCenter® server product made available from VMware, Inc. Cluster manager 130 is configured to carry out administrative tasks for cluster 102, including managing the hosts, managing the VMs running within each of the hosts, provisioning VMs, migrating VMs from one host to another host, and load balancing between the hosts.

According to embodiments, cloud manager 30 includes a distributed scheduler component (e.g., distributed scheduler 32) that communicates with distributed scheduler components implemented in the cluster managers (e.g., distributed scheduler 132) to collect data about devices to which the hosts being managed by each cluster manager are connected, as well as other constraints (e.g., connectivity to particular networks) that the hosts satisfy. In addition, distributed scheduler components implemented in the cluster managers communicate with a distributed scheduler component implemented in each host (e.g., distributed scheduler component 117), which maintains data representative of available resources of the host, to acquire data about the devices the particular host is connected to and the other constraints that the host satisfies.

Figure 2:
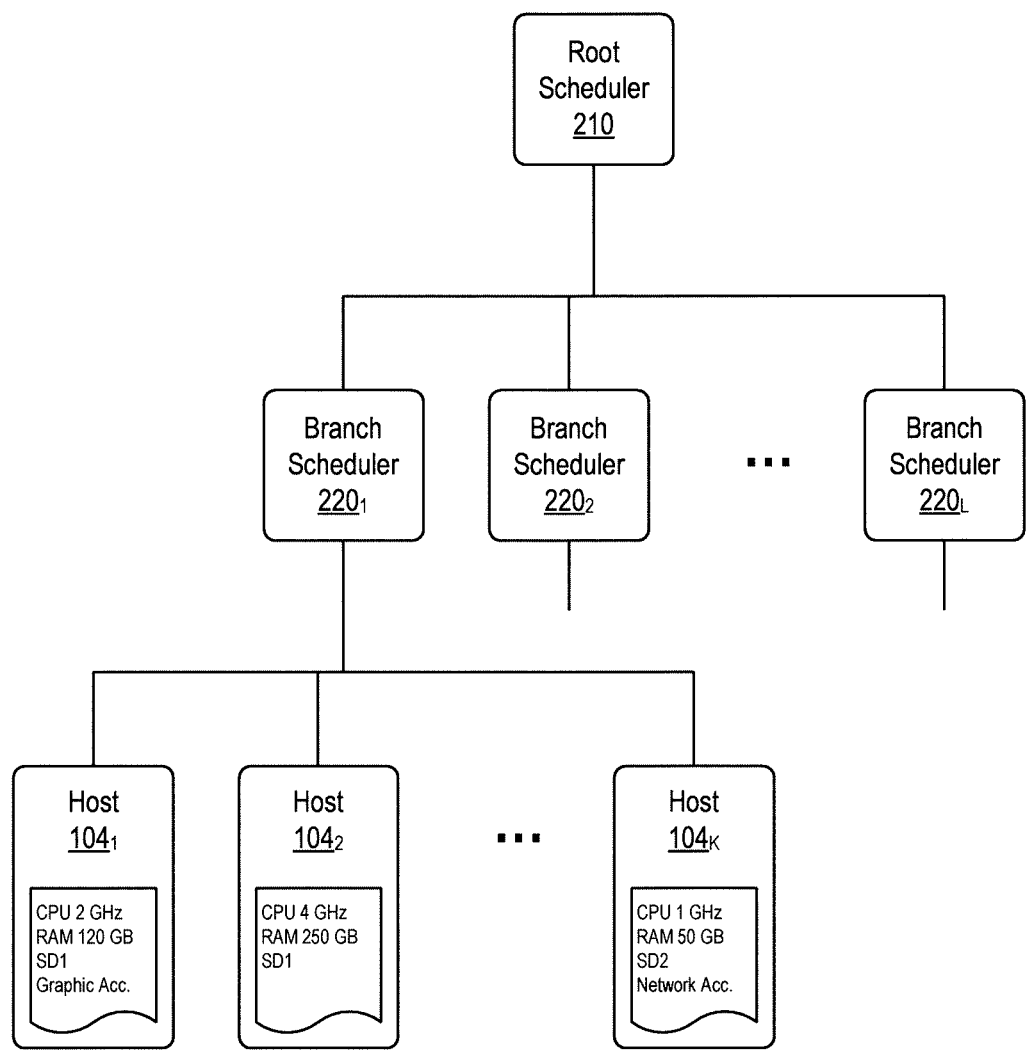
FIG. 2 is a schematic diagram that illustrates nodes of a distributed scheduler according to an embodiment.

The hierarchical arrangement of the different scheduler components in cloud manager 30, the cluster managers, and the hosts is depicted schematically in FIG. 2. At the top of the hierarchy is a root scheduler 210. Root scheduler 210 represents the root node of the hierarchy and is implemented in distributed scheduler 32. Root scheduler 210 is the parent node of branch schedulers 220, each of which is implemented in the distributed scheduler component of the cluster managers (e.g., distributed scheduler 132). Branch schedulers 220 are each a parent node of one or more distributed scheduler components implemented in hosts (e.g., distributed scheduler component 117). In the embodiments, a distributed scheduler component implemented in a host can be a child node of one and only one branch scheduler and a leaf node of the hierarchy of nodes.

As discussed, each host, through its respective distributed scheduler component, maintains information about its resource availability. In the examples shown in FIG. 2, host 104$_1$ currently has available for allocation 2 GHz of CPU and 120 GB of memory, whereas host 104$_2$ currently has available for allocation 4 GHz of CPU and 250 GB of memory and host 104$_K$ currently has available for allocation 1 GHz of CPU and 50 GB of memory. The information further includes connectivity to particular storage devices (SD1 for hosts 104$_1$, 104$_2$, and SD2 for 104$_K$) and presence of special hardware, such as a graphics accelerator or a network accelerator. Each host's distributed scheduler component publishes such connectivity information to its parent branch scheduler, which aggregates the information and further publishes the aggregated information to root scheduler 210. For example, hosts 104$_1$, 104$_2$ may each notify branch scheduler 220$_1$ that they have access to storage device SD1, while host 104$_K$ notifies branch scheduler 220$_1$ that it has access to storage device SD2. In turn, branch scheduler 220$_1$ aggregates the received connectivity information so that storage device SD1 has a count of 2, as two of its child hosts have access to SD2, while storage device SD2 has a count of 1, as only one of its child hosts has access to SD2. Branch scheduler 220$_1$ then publishes such aggregated information to root scheduler 210, which stores the aggregated information. As previously noted, device connectivity, and in particular connectivity to storage devices, is discussed herein as a representative example of a constraint that restricts placement of virtual computing instances, but it should be understood that, more generally, a constraint may include anything other than CPU and memory that the host must have access to (and that not all hosts have access to) for a placement, such as access to a particular network, network accelerator, graphics accelerator, and the like.

When a constrained placement request is received requiring connectivity to a particular storage device (or any other constraint(s)), root scheduler 210 transmits the request down to branch schedulers 220 associated with hosts 104 that satisfy the connectivity constraint (or other constraint(s)) based on stored aggregated information on connectivity (or other constraint satisfaction information) therein, and the branch schedulers 220 in turn forward the constrained placement request to hosts 104 based on the stored device connectivity information (or other stored constraint satisfaction information) therein. Upon receipt of the request, the distributed scheduler components of the hosts 104 each formulates a response to the request based on the resource availability information that is maintained thereby. For example, for a request to place a VM that requires connectivity to storage device SD1 (defining a "constraint" or "placement constraint" of the request), root scheduler 210 may look up stored aggregated device connectivity information and propagate the request down the hierarchy to a subset of branch schedulers, including branch scheduler 220$_1$, which are associated with hosts that have connectivity to device SD1. That is, constraint validation is applied before the request is sent down the hierarchy, and the request is only sent to branch schedulers associated with hosts having access to the requisite device, as indicated by the aggregated information on device connectivity that is maintained by the root scheduler. In turn, the branch schedulers that receive the request further propagate the request down to hosts that are connected to storage device SD1, such as hosts $104_1$, $104_2$ but not to host $104_K$, based on the device connectivity information maintained by the branch schedulers.

The hosts that ultimately receive the request that is propagated down the hierarchy respond with a score determined based on resource availability information they maintain, which may include information on availability of the particular device SD1 (e.g., the amount of free storage space) as well as potentially the availability of other host resources such as CPU, memory, and the like. That is, once the request has reached a subset of the hosts that satisfy the constraint(s) of the placement request, each of the hosts may respond with a score that indicates how much of the resources such as CPU, memory, storage space, etc. is "free" on that host. In a particular embodiment, the score may be a value between 0 and 100, with higher scores indicating more available resources and better placement options. For example, a host that is not using any resources because no VM is placed on the host may return 100, while a node that has exhausted its resources (either CPU, memory, storage, etc.) because it is already running many VMs may return 0. Branch scheduler 220 then compares the scores that hosts 104 returned and selects the highest (or lowest, if lowest is best) score to forward to root scheduler 210, along with an indication of the host which returned the highest score.

Once the highest scores have been returned from branch schedulers 220 to root scheduler 210, root scheduler 210 further compares the returned scores and again selects the host with the highest (or lowest, if lowest is best) score as the best candidate for placing the VM. Once root scheduler 210 has selected a host in this manner, root scheduler 210 transmits a request to place the VM on the selected host.

In one embodiment, root scheduler 210 may randomly select a subset of branch schedulers 220 associated with hosts that satisfy a placement request's constraint(s) and forward the placement request to those randomly selected branch schedulers, and each of the subset of branch schedulers 220 may randomly select a subset of hosts 104 that satisfy the placement request's constraint(s) to further propagate the request to. Continuing the example above, rather than propagating the request to every branch scheduler 220 for which the count of associated hosts having access to storage device SD1 is 1 or greater, root scheduler 210 may randomly choose a subset of such branch schedulers to propagate the request to, and each of the branch schedulers that receives the request may further randomly propagate the request to a subset of child hosts having access to storage device SD1. Such random selection permits resources to be distributed relatively evenly to resource consumers (VMs). For the same reason, in another embodiment, branch schedulers 220 may randomly select one of the highest received scores, but not necessarily the highest score, to forward to root scheduler 210. In yet another embodiment, the hierarchical tree structure may include more than one level of branch schedulers 220, with branch schedulers in each level propagating the placement request down to child branch schedulers associated with hosts among their descendants that satisfy the placement request's constraint(s) or hosts themselves that satisfy the placement request's constraint(s) (or a randomly chosen subset of such branch schedulers or hosts) and propagating a highest score (or a randomly chosen score among a subset of highest scores) received from child schedulers or hosts back up the hierarchal tree structure.

Figure 3:
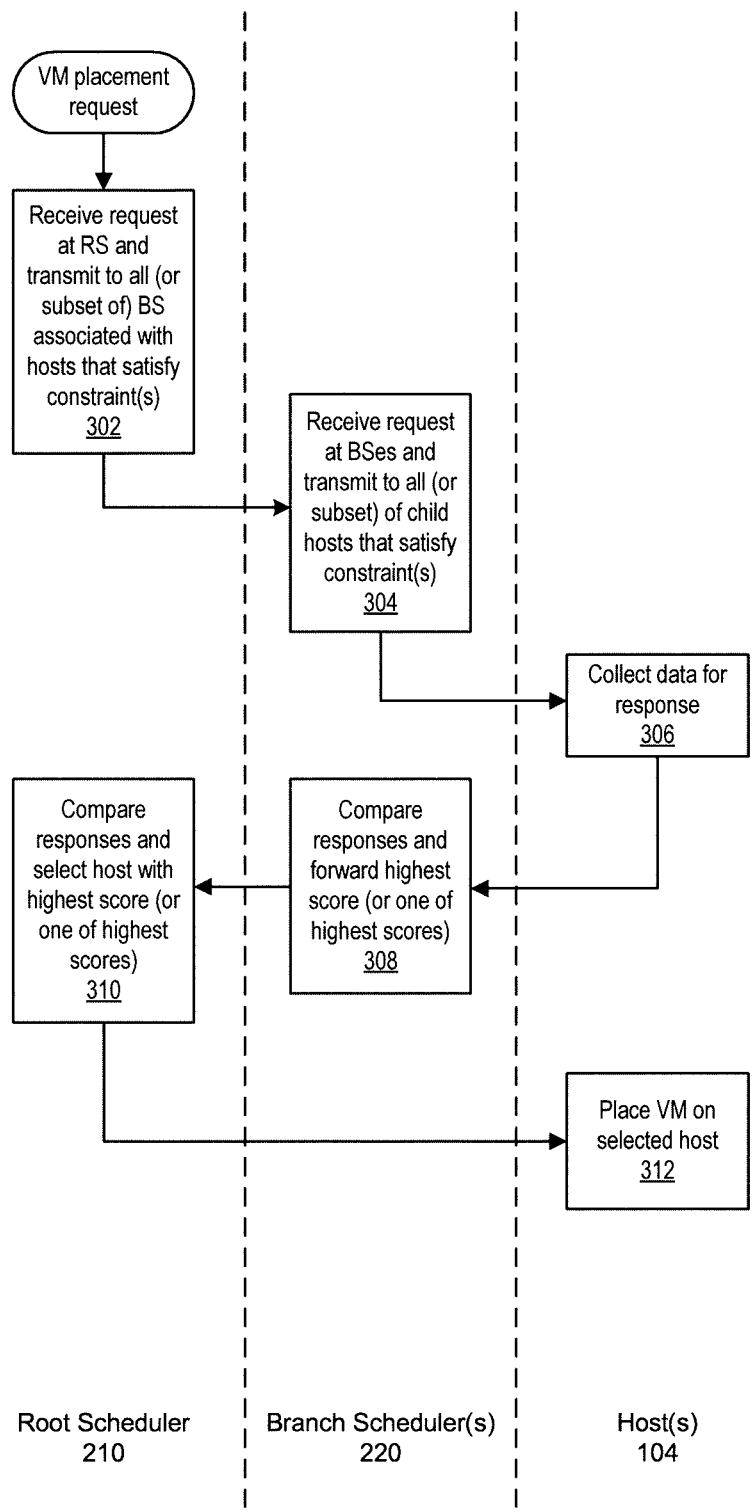
FIG. 3 is a flow diagram that illustrates a method of placing a virtual machine according to an embodiment.

FIG. 3 is a flow diagram that illustrates a method of placing a VM according to an embodiment. The method begins with an external request received by cloud manager 30 to place a VM. The external request may specify one or more constraints necessary to place the VM, the constraints including anything other than CPU and memory that the host must have access to for placement of the VM, such as access to a particular network, device, or the like.

At step 302, upon receipt of the external request, distributed scheduler 32 passes it down to all or to a randomly chosen subset of branch schedulers 220 that have hosts satisfying the request's constraint(s). As discussed, the root distributed scheduler 32 may maintain aggregated information indicating constraints satisfied, such as device connectivity, for hosts associated with branch schedulers (e.g., a count of the number of associated hosts connected to each device), and, in one embodiment, the request may be passed to randomly selected branch schedulers associated with hosts that satisfy the request's constraint(s) so that resources are distributed relatively evenly to VMs.

Then, at step 304, each distributed scheduler component of a cluster that has received the request further passes the request down to all or a randomly chosen subset of the hosts of that cluster that satisfy the request's constraint(s). As previously noted, each cluster distributed scheduler component maintains information indicating constraints satisfied by associated hosts in the cluster, and, in one embodiment, hosts that satisfy the request's constraint(s) may also be randomly selected so that resources are distributed relatively evenly to VMs.

Each host that receives the request collects data for a response at step 306. In one embodiment, each host may return a score indicating the available resources that the host has for satisfying the request. The resources considered may include those pertaining to the request's constraint(s) as well as other host resources such as CPU, memory, storage space, and the like. The score may be computed based on the host's total available resources, the fraction of the host's resources that are available, or any other feasible measure of available resources. In a particular embodiment, the score may be a value between 0 and 100, with higher scores indicating more free resources.

At step 308, branch schedulers 220 compare scores received from the hosts that are their child nodes, and each branch scheduler 220 transmits the highest score or a random one of the highest scores it receives, and an indication of the host associated with the score, to root scheduler 210. That is, an indication of the host or one of the hosts with the most available resources, and therefore the highest score or one of the highest scores, is forwarded to root scheduler 210 along with the score itself. Similar to the random selection of branch schedulers and hosts to propagate requests down to, the random selection of scores to propagate back up permits resources to be distributed relatively evenly to VMs.

Once all branch schedulers 220 have transmitted scores to root scheduler 210, root scheduler 210 at step 310 further compares the scores it receives and selects the host with the highest score or a random one of the hosts with the highest scores. Then, at step 314, root scheduler 210 transmits a message instructing the selected host to execute the VM on its platform.

Figure 4:
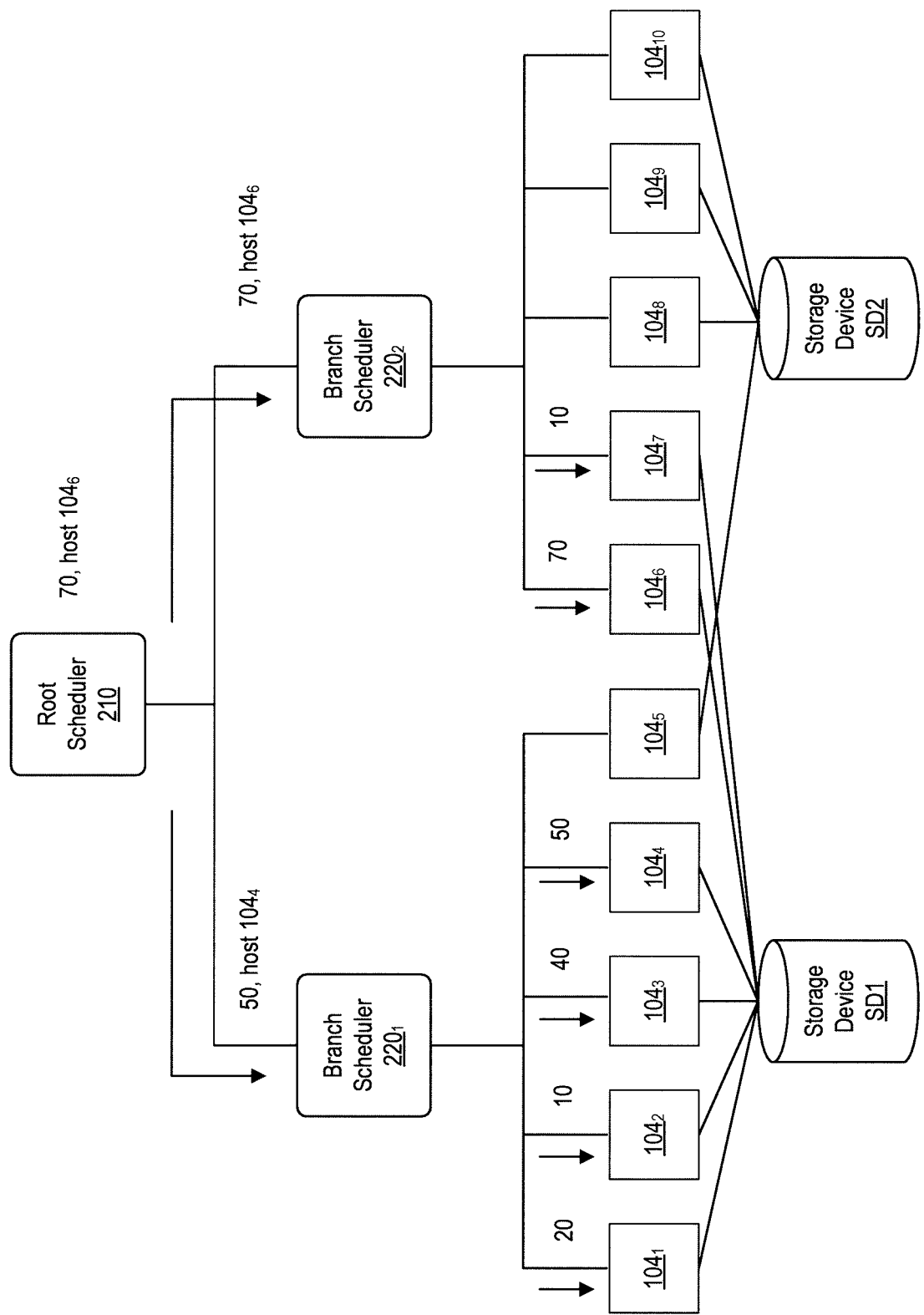
FIG. 4 is a schematic diagram that depicts an example configuration of hosts in a cloud computing system in which the method of FIG. 3 may be carried out.

FIG. 4 is a schematic diagram that depicts an example configuration of hosts in a cloud computing system in which the method of placing a VM according to FIG. 3 may be carried out. As shown, hosts $104_{1-4}$ and $104_{6-7}$ have access to storage device SD1, while hosts $104_5$ and $104_{8-10}$ have access to storage device SD2. As discussed, each host 104 maintains its own resource availability information and further notifies its parent branch scheduler 220 of devices it has access to (and other constraints it satisfies). In turn, each branch scheduler 220 aggregates received connectivity information (e.g., by counting the number of hosts connected to each device) and publishes the aggregated device connectivity information to root scheduler 210, which stores the aggregated information.

In response to a VM placement request received by root scheduler 210 with a constraint that the host must have access to storage device SD1, root scheduler 210 performs constraint validation based on the aggregated device connectivity information it maintains and propagates the received request down to branch schedulers $220_{1-2}$ associated with hosts $104_{1-4}$ and $104_{6-7}$, respectively, that are connected to storage device SD1, and the request is further propagated by branch schedulers $220_{1-2}$ to hosts $104_{1-4}$ and $104_{6-7}$ themselves. Upon receiving the placement request, hosts $104_{1-4}$ and $104_{6-7}$ (and specifically, distributed scheduler components therein) return scores of 20, 10, 40, 50, 70, and 10, respectively, indicating resource availability thereon. Although this example assumes that the request is propagated to all branch schedulers $220_{1-2}$ associated with hosts $104_{1-4}$ and $104_{6-7}$ satisfying the constraint and all the hosts $104_{1-4}$ and $104_{6-7}$ themselves, root scheduler 210 and/or branch schedulers $220_{1-2}$ may instead propagate the request to a randomly selected subset of branch schedulers $220_{1-2}$ and hosts $104_{1-4}$ and $104_{6-7}$, respectively, that satisfy the constraint. For example, root scheduler 210 may randomly select branch scheduler $220_1$ to forward the request to, and branch scheduler may randomly select only hosts $104_1$ and $104_3$ to forward the request to.

As discussed, the scores 20, 10, 40, 50, 70, and 10 propagated up by hosts $104_{1-4}$ and $104_{6-7}$ are indicative of available resources for the VM placement on the respective hosts. Each of branch schedulers $220_{1-2}$ compares the scores it receives and forwards the highest score, along with an indication of the associated host, such as an ID of that host. In this example, branch scheduler $220_1$ forwards the score of 50 and the ID of host $104_4$, while branch scheduler $220_2$ forwards the score of 70 and the ID of host $104_6$. In an alternative embodiment, branch schedulers $220_{1-2}$ may randomly select one of the highest scores it receives to forward, rather than simply forwarding the very highest score. Once root scheduler 210 has received responses from branch schedulers $220_{1-2}$ to which it forwarded the initial request, root scheduler 210 further compares the received scores and selects the host with the highest score for the VM placement, which in this case is host $104_6$ with a score of 70. The VM is then executed on the select host $104_6$.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com), or other cloud-native (distributed) applications. OS-less containers in particular implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A resource scheduling system for a plurality of hosts, the resource scheduling system comprising:
   at least one processor;
   a memory storing at least one application executable by the at least one processor, the at least one application, when executed, causes the at least one processor to at least:
      receive a placement request to place a virtual computing instance in at least one of a plurality of hosts, the placement request specifying at least one constraint;
      transmit a constrained placement request to at least one branch scheduler corresponding to at least one host satisfying the at least one constraint, wherein the at least one branch scheduler is configured to further propagate the constrained placement request to at least one other branch scheduler corresponding to at least one additional host satisfying the at least one constraint;
      obtain a plurality of responses from the at least one branch scheduler and the at least one other branch scheduler;
      select a host from the at least one host and the at least one additional host based upon the plurality of responses; and
      cause the virtual computing instance to be executed on the host, wherein the plurality of hosts and the at least one additional host are configured to maintain data representative of available resources and issue a response indicative of the available resources for the constrained placement request to a respective parent branch scheduler.

2. The resource scheduling system of claim 1, wherein at least one branch scheduler maintains information indicating devices or networks to which respective hosts are connected, and the resource scheduling system is configured to at least store aggregated device or network connectivity information for the at least one branch scheduler, the aggregated device or network connectivity information comprising counts of a number of hosts associated with the at least one branch scheduler that are connected to the devices or networks.

3. The resource scheduling system of claim 1, wherein the at least one additional host comprises a host having the most available resources for the constrained placement request.

4. The resource scheduling system of claim 1, wherein the host is selected at random from the at least one host and the at least one additional host.

5. The resource scheduling system of claim 1, wherein the at least one branch scheduler comprises a component of a cluster manager that manages one of the plurality of hosts.

6. The system of claim 1, wherein the virtual computing instance is a virtual machine.

7. A non-transitory computer readable medium comprising instructions to be executed in a computer system, the instructions causing the computer system to at least:
   receive a placement request to place a virtual computing instance in at least one of a plurality of hosts, the placement request specifying at least one constraint;
   transmit a constrained placement request to at least one branch scheduler corresponding to at least one host satisfying the at least one constraint, wherein the at least one branch scheduler is configured to further propagate the constrained placement request to at least one other branch scheduler corresponding to at least one additional host satisfying the at least one constraint;
   obtain a plurality of responses from the at least one branch scheduler and the at least one other branch scheduler;
   select a host from the at least one host and the at least one additional host based upon the plurality of responses; and
   cause the virtual computing instance to be executed on the host, wherein the plurality of hosts and the at least one additional host are configured to maintain data representative of available resources and issue a response indicative of the available resources for the constrained placement request to a respective parent branch scheduler.

8. The non-transitory computer readable medium of claim 7, wherein at least one branch scheduler maintains information indicating devices or networks to which respective hosts are connected, and the computer system is configured to at least store aggregated device or network connectivity information for the at least one branch scheduler, the aggregated device or network connectivity information comprising counts of a number of hosts associated with the at least one branch scheduler that are connected to the devices or networks.

9. The non-transitory computer readable medium of claim 7, wherein the at least one additional host comprises a host having the most available resources for the constrained placement request.

10. The non-transitory computer readable medium of claim 7, wherein the host is selected at random from the at least one host and the at least one additional host.

11. The non-transitory computer readable medium of claim 7, wherein the at least one branch scheduler comprises a component of a cluster manager that manages one of the plurality of hosts.

12. The non-transitory computer readable medium of claim 7, wherein the virtual computing instance is a virtual machine.

13. A method of placing a virtual computing instance on a host in a plurality of hosts, comprising:

receiving a placement request to place a virtual computing instance in at least one of a plurality of hosts, the placement request specifying at least one constraint;

transmitting a constrained placement request to at least one branch scheduler corresponding to at least one host satisfying the at least one constraint, wherein the at least one branch scheduler is configured to further propagate the constrained placement request to at least one other branch scheduler corresponding to at least one additional host satisfying the at least one constraint;

obtaining a plurality of responses from the at least one branch scheduler and the at least one other branch scheduler;

selecting a host from the at least one host and the at least one additional host based upon the plurality of responses; and causing the virtual computing instance to be executed on the host, wherein the plurality of hosts and the at least one additional host are configured to maintain data representative of available resources and issue a response indicative of the available resources for the constrained placement request to a respective parent branch scheduler.

14. The method of claim 13, wherein the at least one additional host comprises a host having the most available resources for the constrained placement request.

15. The method of claim 13, wherein the host is selected at random from the at least one host and the at least one additional host.

16. The method of claim 13, wherein the at least one branch scheduler comprises a component of a cluster manager that manages one of the plurality of hosts.

17. The method of claim 13, wherein the virtual computing instance is a virtual machine.

* * * * *